(12) United States Patent
Shaw

(10) Patent No.: US 7,598,327 B2
(45) Date of Patent: Oct. 6, 2009

(54) METHOD FOR POLYMERIZING OLEFINS IN A GAS PHASE REACTOR USING A SEEDBED DURING START-UP

(75) Inventor: Benjamin M. Shaw, Calgary (CA)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 822 days.

(21) Appl. No.: 10/986,503

(22) Filed: Nov. 10, 2004

(65) Prior Publication Data

US 2006/0100399 A1    May 11, 2006

(51) Int. Cl.
C08F 2/00 (2006.01)
C08F 210/00 (2006.01)
C08F 110/02 (2006.01)

(52) U.S. Cl. .................... 526/74; 526/201; 526/348; 526/352

(58) Field of Classification Search .............. 526/74, 526/201, 348, 352
See application file for complete search history.

(56) References Cited

U.S. PATENT DOCUMENTS

| 4,543,399 A | 9/1985 | Jenkins, III et al. |
| 4,588,790 A | 5/1986 | Jenkins, III et al. |
| 4,994,534 A | 2/1991 | Rhee et al. |
| 5,352,749 A | 10/1994 | DeChellis et al. |
| 5,416,175 A | 5/1995 | Song et al. |
| 5,462,999 A | 10/1995 | Griffin et al. |
| 5,668,228 A | 9/1997 | Chinh et al. |
| 6,472,484 B1 * | 10/2002 | Abe et al. ................ 526/201 |

FOREIGN PATENT DOCUMENTS

| EP | 0780404 A2 | 6/1997 |
| EP | 0780404 A3 | 12/1997 |
| EP | 1099715 A1 | 5/2001 |
| EP | 1207170 A1 | 5/2002 |
| WO | WO 97/44371 | 11/1997 |
| WO | WO 99/02573 | 1/1999 |
| WO | WO 00/58377 | 10/2000 |
| WO | WO 01/66610 A1 | 9/2001 |

* cited by examiner

*Primary Examiner*—William K Cheung
(74) *Attorney, Agent, or Firm*—Conley Rose, P.C.; Rodney B. Carroll; Daniel Burke

(57) ABSTRACT

A method of starting up a gas phase polymerization reactor, comprising controlling an amount of hydrocarbon absorbed in a polymer seedbed during startup to avoid formation of agglomerates or sheeting on an interior wall of the reactor. A system for of starting up a gas phase polymerization reactor, comprising a controller coupled to the polymerization reactor and controlling an amount of hydrocarbon absorbed in a polymer seedbed during startup to avoid formation of agglomerates or sheeting on an interior wall of the reactor.

20 Claims, 4 Drawing Sheets

METHOD FOR POLYMERIZING OLEFINS IN A GAS PHASE REACTOR USING A SEEDBED DURING START-UP

FIELD OF THE INVENTION

The present invention relates generally to a process for polymerizing olefins in a gas phase reactor using a seedbed during start-up while preventing the formation of agglomerates or sheeting on the reactor wall.

BACKGROUND OF THE INVENTION

The polymerization of olefins in a fluidized gas phase reactor is typically carried out using a seedbed. In the case of polyethylene, one of two types of seedbed is used: a linear low-density polyethylene (LLDPE) seedbed or a high-density polyethylene (HDPE) seedbed. In the case of polymerization of other olefins, other suitable types of seed beds may be used. In the polyethylene process, the low density seedbeds may absorb more heavy hydrocarbons than the high density seedbeds, resulting in an increase in the formation of agglomerates or sheeting on the reactor wall. As a result, the higher density seedbeds have typically been used when starting-up a reactor for polymerizing olefins. However, the high density seedbeds may generate high amount of waste and subproducts, resulting in lost production time to remove these substandard products.

The formation of agglomerates and sheeting on the reactor walls may be explained by various factors. Agglomerates and sheeting may form when the polymerization temperature is too close to the polymer sintering temperature (temperature at which agglomerates start forming) or when the polymer particles become excessively sticky. Highly active fine particles may concentrate in the upper elevations of the polymerization zone, towards the top of the fluidized bed and in the powder disengagement zone above the bed, thus leading to local hot spots and potential agglomeration and sheeting. The accumulation of polymer at the reactor walls can be as thin as a few micrometers to several centimeters.

Agglomeration and sheeting are responsible for costly production losses, unreliable operation, which may be unsafe, and limit overall plant performance. The need to clean the reactor and any other maintenance issues related to sheeting and agglomeration formation result in unplanned reactor downtime, leading to reduced production and revenue. Therefore, a need exists to provide additional methods of controlling agglomeration and sheeting formation to decrease the amount of off-specification products as well as improving the economics of the gas phase reactor process.

SUMMARY OF THE INVENTION

Disclosed herein is a method of starting up a gas phase polymerization reactor, comprising controlling an amount of hydrocarbon absorbed in a polymer seedbed during startup to avoid formation of agglomerates or sheeting on an interior wall of the reactor.

Also disclosed herein is a system for starting up a gas phase polymerization reactor, comprising a controller coupled to the polymerization reactor and controlling an amount of hydrocarbon absorbed in a polymer seedbed during startup to avoid formation of agglomerates or sheeting on an interior wall of the reactor.

BRIEF DESCRIPTION OF THE DRAWINGS

For a more detailed description of the embodiments of the present invention, reference will now be made to the accompanying drawings, wherein.

DETAILED DESCRIPTION OF THE EMBODIMENT

Figure 1:
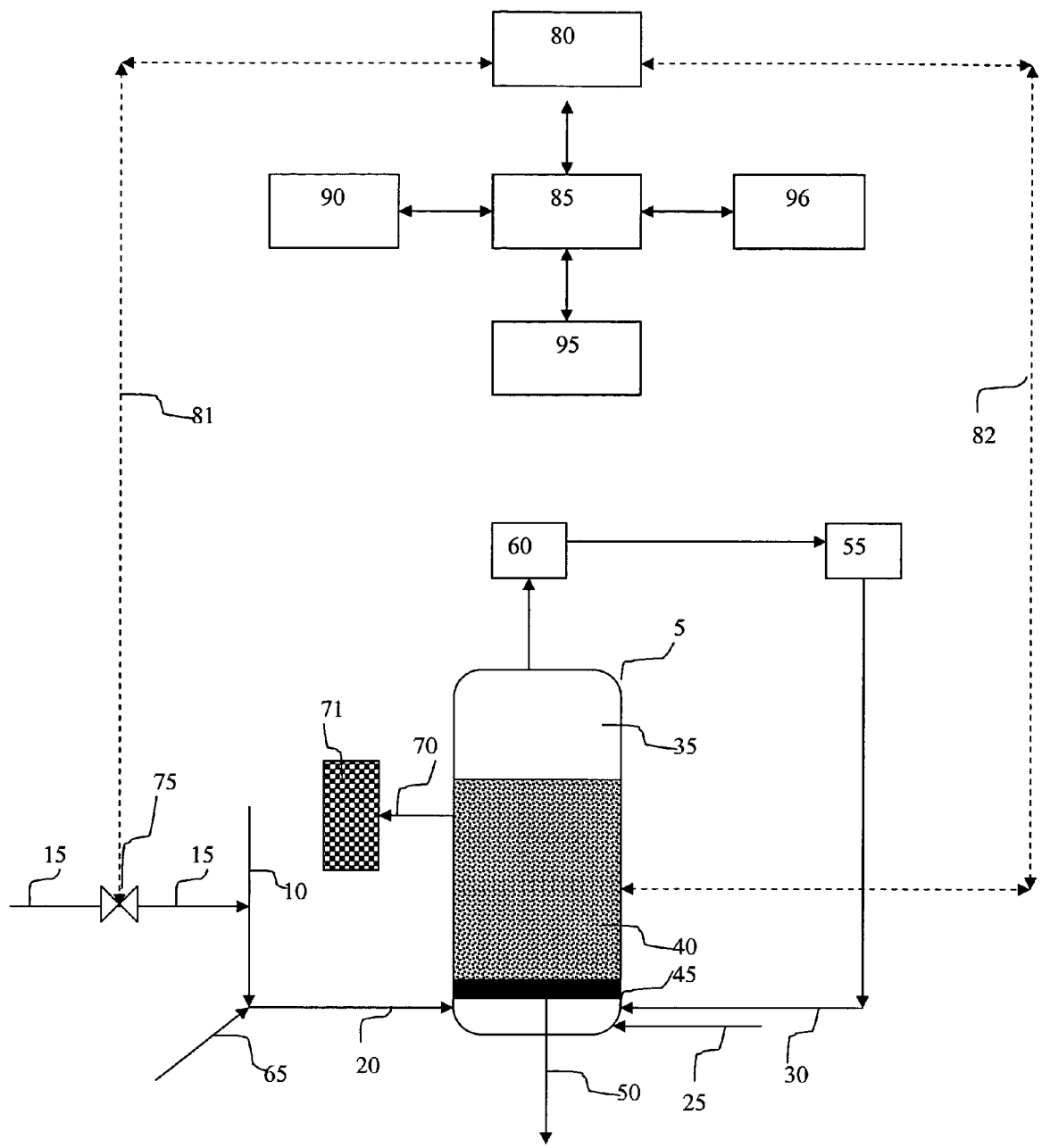
FIG. 1 is a schematic diagram of a reactor system linked to a control system.

In a reaction zone, a monomer, and optionally a comonomer, and a catalyst are combined under polymerization conditions to produce a polyolefin for example a homopolymer or a copolymer when comonomer is present. The monomer and comonomer are olefins such as ethylene, propylene, butene-1, hexenes such as 4-methylpentene-1 or hexene-1, octene-1, decene-1 or combinations thereof. The polymerization process is carried out in a reactor system coupled with a control system, in an embodiment as shown in FIG. 1. The reactor system comprises a reactor 5 comprising a reaction zone, a feed gas stream 20, a catalyst 25, a grid plate 45, a seedbed 40, a recycle stream compressor 55, a recycle stream cooler 60 and associated piping. The control system comprises a distributed control system 80, a control valve system 75,and an operator 90.

For the purpose of this discussion, the olefin polymerization process will be discussed generally in terms of ethylene polymerization, preferably linear low density polyethylene (LLDPE). However, although the process is generally described as relating to ethylene polymerization, the process is understood as being merely illustrative and is valid for any other polymerization of olefins or combinations of olefins other than or in addition to ethylene. During start-up of a polymerization reactor, a bed of polymer particles similar to the polymer to be produced is loaded into the reactor. Therefore, a reactor used to make polyethylene may be initially loaded with a LLDPE seedbed during the start-up phase. As the reaction occurs, the initial or starting seedbed will be replaced with an operational polymer bed. For the purpose of this discussion, the initial or starting seedbed and the operational polymer bed will be referred to jointly as a seedbed, e.g. an LLDPE seedbed.

The reactor 5, defined as a fluidized gas phase reactor, is a vertical vessel comprising a disengagement section 35 at the upper part of the vessel and a grid plate 45, defined as a gas distribution grid plate or perforated plate, at the lower part of the vessel. The monomer 10 and the catalyst 25 are continuously introduced into the reactor 5 below grid plate 45 via feed gas stream 20. The comonomer 15, when present, is also introduced into the reactor 5, either combined with the monomer 10 as part of a feed gas stream 20 or independently into the reactor 5. The feed gas stream 20 may be adjusted to produce a polymer with desired physical properties, e.g., a specific density and melt index, and is typically dependent on how effectively the catalyst 25 incorporates the comonomer 15 and its rate of reaction with hydrogen. The feed gas stream 20 may also contain a non-condensable inert such as a nitrogen 65 to increase the dew point of the feed gas composition. The monomer 10, the comonomer 15 and the nitrogen 65 enter near the bottom of the reactor 5 and pass thru the grid plate 45, thus providing a good gas distribution in the reactor 5 and promoting an efficient operation. As an illustration, FIG. 1 shows the monomer 10, the comonomer 15 and the nitrogen 65 streams combined and feeding the reactor 5 through the feed gas stream 20.

The reactor 5 may be operated at operating conditions suitable for an olefin polymerization. The range of temperature, suitable for such a polymerization, may be from about 158° F. to about 200° F., alternatively from about 180° F. to about 195° F., depending on the physical properties of the polymer to be produced. The range of pressures for such a polymerization depends on the particular monomer chosen for the reaction and may be alternatively from about 150 psig to about 315 psig. To maintain a viable fluidized bed, the gas flow rate through the polymer bed is typically maintained above the minimum required flow for fluidization, and maybe from about one and one-half to about ten times the minimum required flow, usually in the range of about three to six times. As an example, the fluidization velocity may vary from about 1.6 ft/s to about 2.4 ft/s.

The catalyst 25 used for the olefin polymerization may be a transition metal catalyst such as a conventional Ziegler-Natta catalyst, a chromium based catalyst, a metallocene catalyst, or any other catalyst or combination thereof suitable for gas phase polymerization. Traditional Ziegler-Natta catalysts typically comprise a transition metal halide, such as titanium or vanadium halide and an organometallic compound such as trialkylaluminum, serving as an activator for the transition metal halide. The active Ziegler-Natta catalyst may also be impregnated onto an inorganic support such as silica or alumina. The metallocene catalyst is typically supported on support materials such as inorganic oxides like silica, alumina, magnesia or polymeric such as polyethylene. The appropriate selection of the catalyst to be used for the olefin polymerization depends, in part, on the type of polymer produced, in this case a linear low density polyethylene. In an embodiment, the catalyst 25 is a Ziegler-Natta catalyst. As part of a catalyst changeover, the residual polymer particulates are removed through a withdrawal line 50 and a central opening in the grid plate 45. The diameter of the withdrawal line 50 may be small compared to the size of the grid plate 45, about 4 to 6 inches as opposed to about 16 feet for the grid plate size. During operation, the withdrawal line 50 is nitrogen purged.

The polymerization of olefins is an exothermic reaction. As a result, means to cool the seedbed 40 in the reactor 5 are used to remove the heat of polymerization. Without such a cooling process, the seedbed 40 may increase in temperature and, as a result, the catalyst may become inactive or the bed may start melting. A cooling process comprises a recycle stream 30, consisting of the monomer 10 and, if desired, an inert carrier gas such as the nitrogen 65. The cooling process may be accomplished by means of one or more heat exchanger stages to remove the heat in the bed of polymer. The recycle stream 30 may be cooled through the recycle stream cooler 60 and subsequently compressed through the recycle stream compressor 55 or vice versa. The recycle stream 30 is then reintroduced at the bottom of the reactor 5, passes through the grid plate 45, lifts the bed and holds it in a fluidized state. As a result, the selected temperature of the seedbed 40 in the reactor 5 is maintained at an essentially constant temperature, e.g., about 200° F., under steady state conditions by constantly removing the heat of reaction.

A portion of the recycle stream 30 may also be condensed and fed back to the reactor 5 as a liquid to assist in the heat removal via an evaporative cooling. Condensation occurs as the recycle stream 30 is cooled to a temperature below its dew point. Such an operation is referred to as a condensation mode, details of which are set forth in U.S. Patents WO 00/58377; WO 99/02573; U.S. Pat. Nos. 4,543,399; 4,588,790; 4,994,534; 5,352,749; 5,462,999 and 5,668,228, each of which incorporated herein by reference in its entirety. The condensation mode is used to achieve higher cooling capacities and therefore higher reactor productivity.

The seedbed 40 is supported by the grid plate 45 and is maintained in a fluidized state by adjusting the rate of the recycle stream 30 to the reactor 5. The seedbed 40 contains growing and formed particulate polymer particles, as well as catalyst particles. As the catalyst 25 converts the monomer 10 into polyolefin, the level of the bed of polymer increases gradually in the reactor 5. To keep the height constant in the reactor 5, a portion of the polymer produced is removed from the reactor 5 at the rate of formation of the particulate polymer product. The polymer e.g., LLDPE, is discharged through the polymer line 70 and stored in a storage vessel 71.

The control system is operatively coupled to the reactor system and comprises a distributed control system 80, a control valve system 75 and an operator 90 in an embodiment as shown in FIG. 1. All three elements interface with each other to control the process parameters 95 in the reactor system to achieve a desired polymer product, while reducing the formation of sheeting and agglomeration.

The distributed control system 80 may be one of various known types and may include multiloop controllers or programmable logic controllers. The distributed control system 80 comprises a workstation 85 as a platform, displaying the process parameters 95 in real-time as well as typically a historic data acquisition 96 from a process historian database. The process parameters 95 may include the pressure, the temperature and the feed gas composition in the reactor, or the opening of the flow control valve among others. The historic data acquisition 96 allows the operator 90 to compare previous historic process conditions and optimize or adjust the current process parameters 95, based on past operating conditions, thereby ensuring optimum operation of the reactor system at design conditions. The distributed control system 80, coupled to the reactor 5 via line 82, displays the updated process conditions in the reactor 5 to the operator 90. The distributed control system 80 allows the operator 90 to access and control the process parameters 95, for example to control the amount of comonomer 15 fed to the reactor 5.

The control valve system 75, e.g., an automatic control device system, controls the amount of comonomer 15 fed to the reactor 5. The control valve system 75 is coupled via line 81 to the distributed control system 80, which displays on the workstation 85 the opening of the valve and the amount of comonomer 15 fed to the reactor 5. The opening of the valve can be predicted based upon the feed gas composition and/or physical properties by using for example a formula developed from modeling literature or in-house data, the formula being programmed into the workstation 85. The operator 90 monitors the process parameters such as mass flow rate of comonomer 15 and adjusts accordingly the opening of the valve on the workstation 85, which sends in return the new desired opening to the distributed control system 80. The distributed control system 80 then sends the signal to the control valve system 75, which opens the control valve to the desired value.

The distributed control system 80, the operator 90 and the control valve system 75 interact with each other, adjusting as needed the amount of comonomer 15 fed to the reactor 5 to ensure the ratio of comonomer 15 to monomer 10 is controlled so as to prevent any substantial agglomeration or sheeting in the reactor 5 during start-up.

For the remainder of the discussion, the monomer 10 will be referred to as ethylene 10 and the comonomer 15 referred to as hexene 15. However, such reference should not limit the scope of the disclosure, as other olefins can be used both as monomer and as comonomer. The following discussion is based on the implementation of the method of operation used to control the amount of hydrocarbons absorbed in the seedbed 40 e.g., a LLDPE seedbed, to avoid substantial formation of agglomerates and sheeting on the reactor walls. The method involves determining the critical amount of hydrocarbons absorbed, modeling the reactor, and using this model to optimize the start-up sequences by controlling various process parameters.

Figure 2:
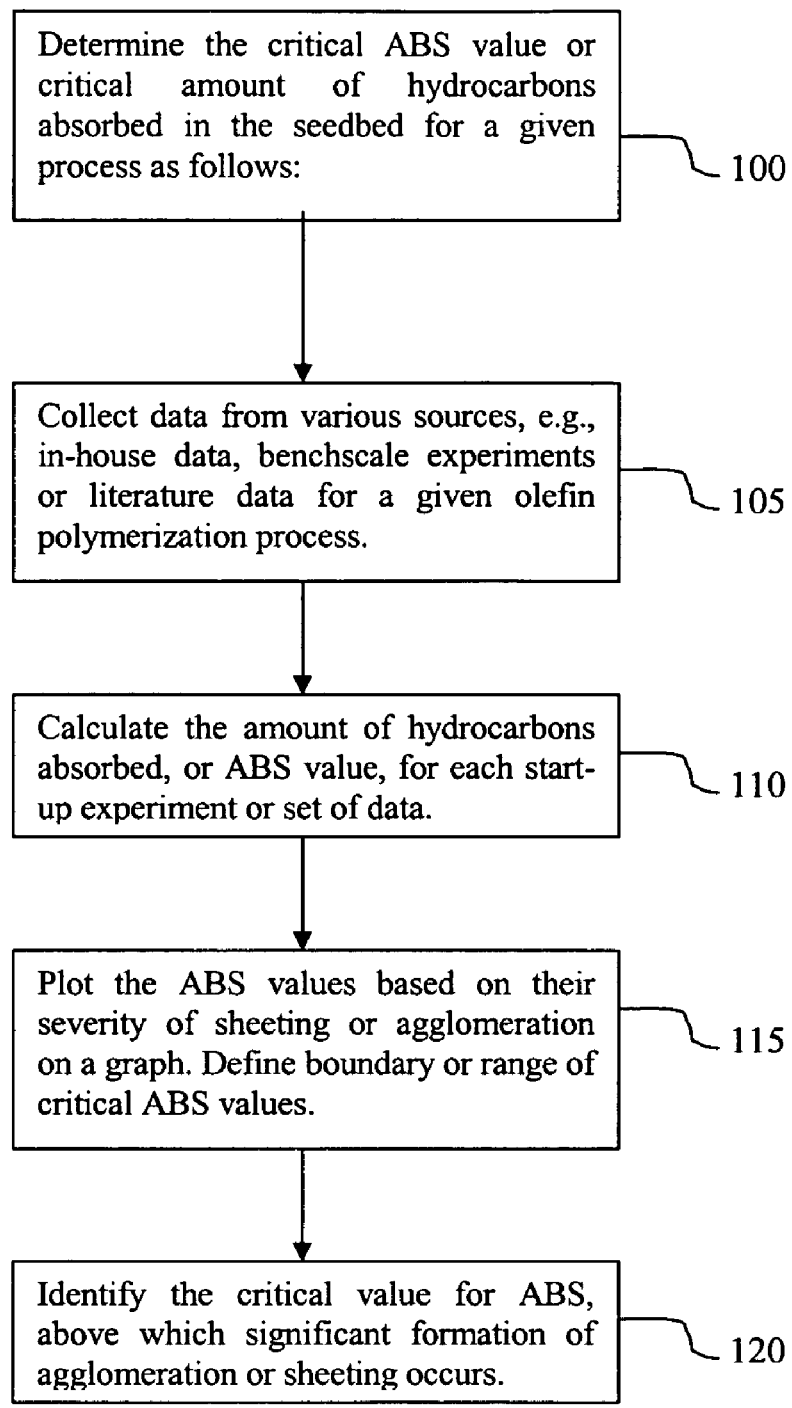
FIG. 2 is a control algorithm flow diagram describing steps to determine and identify a critical amount of hydrocarbons absorbed in the seedbed.

In an embodiment as shown in FIG. 2, the critical amount of hydrocarbon absorbed in the seedbed 40 is determined from previous plant experience or in-house data for a given olefin polymerization process, as disclosed in the method summary box 100. The critical amount of hydrocarbon absorbed in the seedbed 40, or critical ABS value, is the amount of hydrocarbon absorbed in the seedbed above which an undesirable degree of agglomeration or sheeting occurs in the reactor 5.

As disclosed in box 105, several sources of data may be used to identify the critical ABS value for a given polymerization process comprising polymerization reactants, catalysts, reactor system, and operating conditions. One source may be based on in-house data, collected over a period of time from previous plant experiences involving the same monomer 10, comonomer 15 and catalyst 25 under similar operating conditions in a given reactor system. Such in-house data may provide a range of ABS values, or amount of hydrocarbons absorbed in the seedbed 40, where the formation of sheeting and agglomeration occurs in a gas phase reactor such as reactor 5. Another source may be to use benchscale experiments if no in-house data is available. Benchscale testing may also provide a range of ABS values to be used for comparison purposes. Literature data may also be used for comparison purposes using like reactants and similar operating conditions. The goal is to collect data on the process conditions or parameters involved during the formation of sheeting or agglomeration for a given olefin polymerization process with similar monomer and comonomer involved as in the reactor 5.

As disclosed in box 110, the process conditions or parameters, such as pressure, temperature or composition, involved in each of these runs are then evaluated and the amount of hydrocarbons absorbed in the seedbed 40 is calculated. Each set of experiments, collected through these various sources, may provide an ABS value. A full array of ABS values is then available to be analyzed and compared, based on the amount of sheeting or agglomeration being formed on the reactor walls. Typically, such process condition data may be divided into two groups: the first group comprising runs conducted with a significant amount of sheeting or agglomeration and the second group comprising runs without any significant sheeting or agglomeration formation.

As disclosed in box 115, the ABS values, collected from in-house data, benchscale experiments, or literature data, may now be plotted by severity of the formation of agglomeration or sheeting in the reactor 5. The graph may display the different values of ABS in relation to the amount of sheeting or agglomeration formed during the start-up phase in a reactor. The graph may subsequently provide a clear picture of the boundary or range of the amount of hydrocarbons absorbed above which a significant amount of sheeting or agglomeration occurs on the reactor walls. The critical value for ABS, above which a significant amount of agglomeration or sheeting formed would result in possible loss time production, downtime or shutdown of the reactor 5, may then be determined from this graph, as described in the sequence 120. In an embodiment, the critical value for ABS is 0.1 g of hydrocarbons absorbed per gram of LLDPE.

Figure 3:
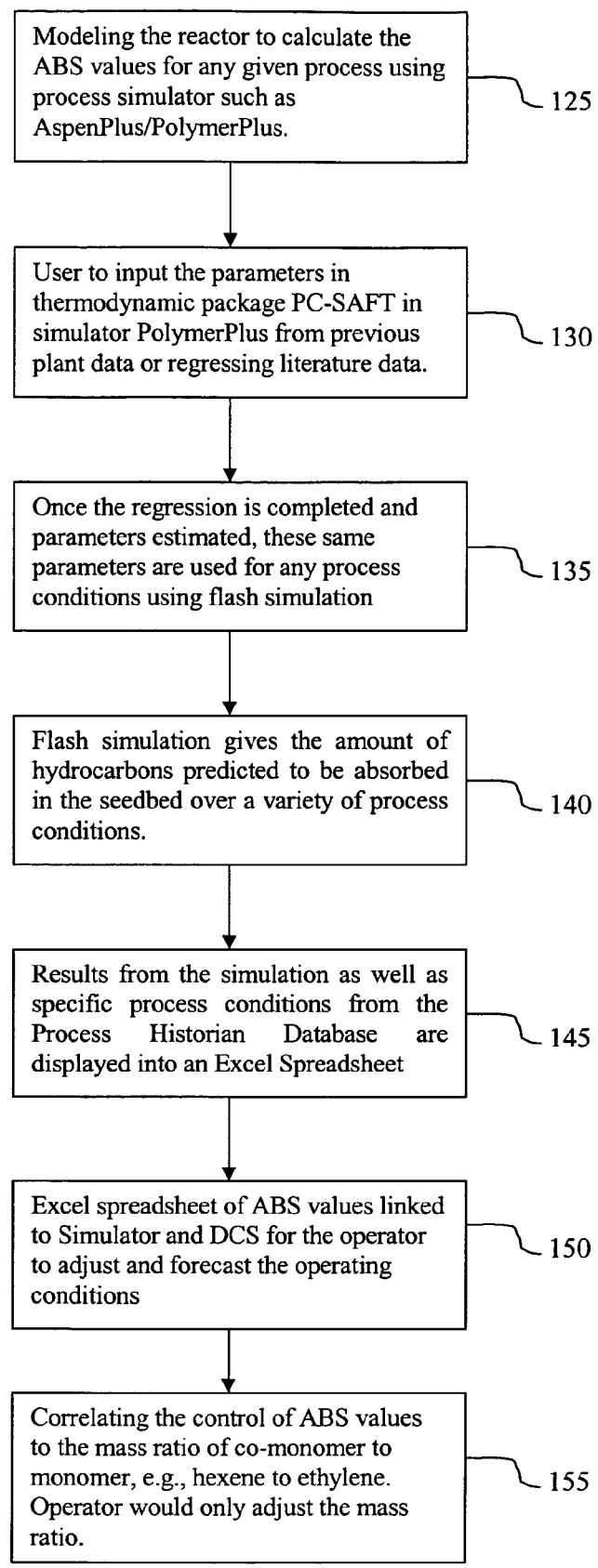
FIG. 3 is a control algorithm flow diagram describing modeling steps to calculate the amount of hydrocarbons absorbed in the seedbed.

In an embodiment as shown in FIG. 3, the amount of hydrocarbons absorbed in the seedbed 40 is predicted based on reactor modeling and thermodynamic packages. The critical value for ABS, e.g., of 0.1 g per gram of LLDPE, is implemented into a model of the polymerization system, e.g., reactor 5, as a reference or comparison value. The modeling of the reactor 5 is based on a simulator such as an AspenPlus simulator, among others, as disclosed in box 125. The simulator comprises a simulation of the polymerization system for example a typical gas phase reactor such as the reactor 5 with a given set of process parameters 95, such as the pressure and the temperature, the feed gas 20 composition, the catalyst 25, or combinations thereof.

As disclosed in box 130, a PolymerPlus simulator module is used within the AspenPlus simulator. In an embodiment, a thermodynamic package known as PC-SAFT (Perturbed Chain Statistical Associating Fluid Theory) is selected. Other appropriate modules or packages may also be used. The PC-SAFT package is suitable for polymers and hydrocarbons reactions, especially when operating at elevated temperatures and pressures, as is the case for the olefin polymerization process carried out in the reactor 5. The PC-SAFT package has a number of different parameters, defined as flash parameters, which may be input by a user. The flash parameters are listed in the manual of the AspenPlus/PolymerPlus simulator and may include parameters for polymerization, for example ethylene polymerization, such as LDPE, LLDPE or HDPE parameters as well as the interaction parameters between monomers and comonomers such as ethylene and hexene. The flash parameters may initially be estimated from regressing literature data, including in-house data from the company or technical books on solubility of monomer in the seedbed, for example ethylene in high-density polyethylene seedbed and linear low-density polyethylene seedbed among others. The flash parameters may also be initially estimated by the engineer or user, based on previous plant data or plant site experience. Once the regression is completed, the flash parameters are estimated, as disclosed in box 135. The flash parameters are valid for any given process conditions or process parameters 95 and are then used in a simple flash simulation or flash calculation using AspenPlus/PolymerPlus.

As disclosed in box 140, the output of the flash simulation predicts how much hydrocarbon is absorbed in the seedbed 40. Another way to measure the amount of hydrocarbons absorbed would be to sample and analyze flake or the seedbed 40 from the reactor 5. The sample may be heated up and the amount of hydrocarbons absorbed determined. However, actual sampling and testing would be time-consuming. Thus, an efficient way to actually predict the amount of hydrocarbons absorbed is based on using a thermodynamic package such as PC-SAFT in PolymerPlus as described previously.

The flash calculation is repeated over a variety of process conditions, which would be expected during the entire start-up phase of the reactor. Each of these flash calculations provides an ABS value, dependent on a specific set of process conditions. The reactor modeling calculates the ABS values that may be used as a basis for operation of the reaction system during the entire start-up.

As disclosed in box 145, the results of the various ABS values from the simulation are tabulated and displayed, for example on an Excel spreadsheet for ease of access by the operator 90. The Excel spreadsheet may initially be a look-up table for the operator 90 to control the process parameters 95. However, in an effort to facilitate and optimize the control of the process conditions taking place during the start-up phase, the ABS data may be linked to the simulator and/or automatically fed into the process control system. For example, the operator 90 may only need to access the Excel spreadsheet, which is being continuously updated by the various runs on the simulator. The distributed control system 80 may then display the ABS values combined with the new process parameters 95 at any given time, as well as possibly past operating conditions from the historic data acquisition system 96. The historic data acquisition system 96 is part of the process historian database, which records all the process parameters on a plant site, usually on a 15 second basis, and displays either snapshot values or average values over a given period of time chosen by the operator, such as a day, a week or a month for example.

As disclosed in box 150, the process historian database enables the operator 90 to access the process parameters 95 at all times, at any interval suitable for the specific control, and compare the current process parameters 95 with past operating conditions in order to optimize the start-up process and avoid any excessive sub-products formed, possibly resulting in loss-time production. The simulation displays on the Excel spreadsheet the current absorbance levels of hydrocarbons in the seedbed 40 but may also display the predicted absorbance levels based on the future process conditions required by the operator 90. The Excel spreadsheet may also be set up such that an alarm triggers whenever the amount of hydrocarbon absorbed in the seedbed 40 is near the upper limit e.g. the 0.1 g per gram of LLDPE critical ABS, as described previously. This automated spreadsheet enables the operator 90 to correct promptly the process conditions as the start-up progresses and operate at optimum conditions while preventing the formation of sheeting or agglomerates on the reactor walls. As an alternative to manual look-up and control of one or more process parameters, such packages may be automated via the process control logic implemented via the distributed control system 80.

As disclosed in box 155, as an alternative for controlling the ABS value and to simplify the control of the process parameters 95, a correlation may be established between the ABS value and the mass ratios, for example the mass ratio of hexene 15 to ethylene 10, such that only the mass ratio of hexene 15 to ethylene 10 may be adjusted during the start-up process. This method simplifies the number of variables being adjusted at the same time. The operator 90 would only adjust the mass ratio, thus becoming a key variable, to prevent formation of sheeting or agglomeration on the reactor walls. The mass ratio would directly reflect the amount of hydrocarbon absorbed in the seedbed 40.

However, the correlation between the ABS value and the mass ratio is not a direct relation as the amount of hydrocarbons absorbed in the seedbed 40 is not only dependent on the mass ratio of hexene 15 to ethylene 10 but is also dependent on the pressure and temperature of the feed gas stream 20. Therefore, an alternative embodiment is for the distributed control system 80 to take into account the pressure and temperature of the feed gas stream 20, and send back the new mass ratio value on the workstation 85. The operator 90 may then adjust the mass ratio accordingly to the process conditions in the reactor 5, as a more direct relation to the ABS value.

In an embodiment, the flow of hexene 15 fed to the reactor 5 controls the mass ratio of hexene 15 to ethylene 10. The flow of hexene 15 is controlled via the control valve system 75 linked to the distributed control system 80. The amount of hexene 15 is therefore carefully controlled during the initial start-up phase to ensure the amount of hydrocarbons absorbed in the seedbed 40 never exceeds the critical ABS, e.g., about 0.1 g per gram of LLDPE. In an embodiment, the mass ratio of hexene to ethylene may be from about 0 and about 0.5, alternatively from about 0.01 to about 0.1, alternatively about 0.05, where the critical ABS is about 0.1 g hydrocarbons absorbed per gram LLDPE. The maximum value is to be considered merely as illustrative and is not limiting the scope of our discussion.

Figure 4:
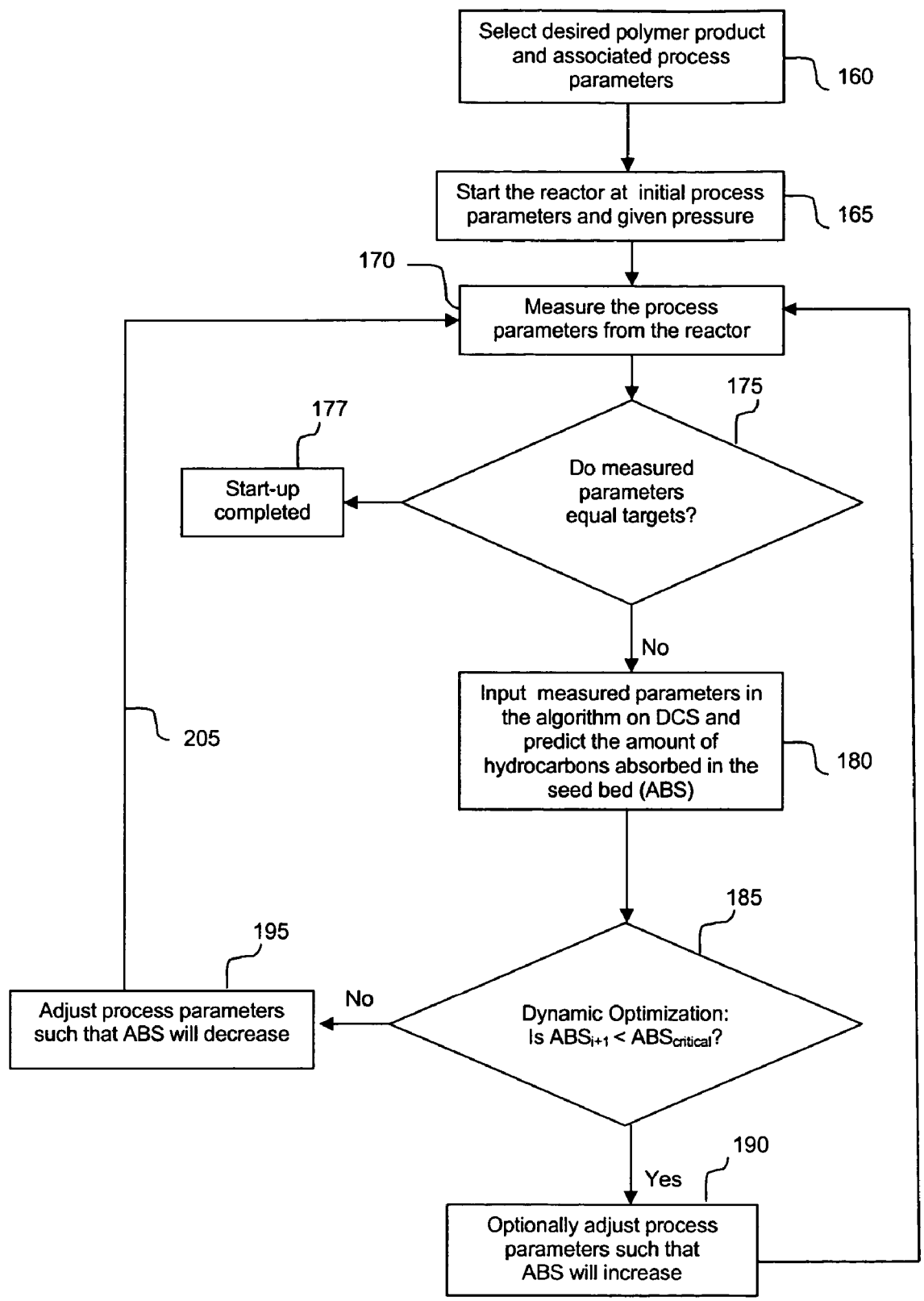
FIG. 4 is a control algorithm flow diagram describing start-up sequences for controlling the amount of hydrocarbons absorbed in the seedbed.

In an embodiment as shown in FIG. 4, the reactor modeling is implemented during the actual start-up of the polymerization system via a controlled ramp up of the process parameters. In an embodiment, the start-up time is minimized by quickly ramping up the process parameters to reach the desired steady state conditions in a minimum time, hence limiting the amount of sub-products formed during the start-up. For example, start-up time may be optimized such that a desired polymer product with a desired density and a melt index is produced while agglomeration or sheeting formation on the reactor walls is prevented or limited.

As disclosed in box 160, a desired polymer product and the associated process parameters are identified. For example, using ethylene polymerization as an example, process parameters 95 for reactor 5 may be the initial temperature ($T_i$), the final temperature ($T_f$), and temperatures at intervals there between ($T_{i+1}$); the initial pressure ($P_i$), the final pressure ($P_f$), and pressures at intervals there between ($P_{i+1}$); the initial flow rate of hexene ($FH_i$), the final flow rate of hexene ($FH_f$); and hexene flow rates at intervals there between ($FH_{i+1}$); the initial flow rate of ethylene ($FE_i$), the final flow rate of ethylene ($FE_f$), and ethylene flow rates at intervals there between ($FE_{i+1}$); wherein initial refers to the time (t) at the beginning of start-up (i.e., $t_i$), final or target refers to the time at the end of start-up (i.e., $t_f$), and intervals there between refers to times between the initial and final time (i.e., $t_{i+1}, t_{i+2}, \ldots t_n$). Also, initial ramp rates are selected for increasing selected process variables over time, for example the ramp rate for the temperature ($RR_T$) and the ramp rate for hexene flow rate ($RR_H$). In an embodiment the ramp rate for the temperature may be in the range of about 1° C./min. In an embodiment, as for the mass ratio of hexene 15 to ethylene 10, a typical ramping rate for the flow of hexene 15 may correspond to a flow required to achieve about three to six times the minimum total flow (e.g., ethylene and hexene) required for fluidization.

As disclosed in box 165, the reactor is started at the initial process parameters. Catalyst and reactants are fed to the reactor 5 at an initial temperature $T_i$ and pressure $P_i$, for example ambient conditions. The monomer 10, comprising for example ethylene, is continuously introduced at the bottom of the reactor 5 thru the grid plate 45 at flow rate $FE_i$. If comonomer is to be included, the comonomer 15, comprising for example hexene 15, is also introduced at the bottom of the reactor 5 thru the grid plate 45 at a flow rate $FH_i$. The catalyst 25 is also continuously introduced in the reactor 5.

As disclosed in box 170, the actual process parameters 95 are measured from sensors located in the polymerization system and connected to the DCS system. For example, temperature, pressure, and composition (e.g., composition of recycle stream 30) may be sensed after an interval of time, $t_{i+1}$. As disclosed in box 175, the measured parameters are compared to the final process parameters. If the measured process parameters equal (within an acceptable tolerance) the target process parameters, then start-up is complete, as disclosed in box 177. If the measured process parameters do not equal (within an acceptable tolerance) the target process parameters, the measured process parameters are used to calculate the $ABS_{i+1}$, as disclosed in box 180.

During the first hour or so of the start-up, the process conditions may not be clearly settled out in the reactor. As a result, the process parameters 95 initially sensed on the distributed control system 80 may not be representative of the process conditions taking place in the reactor 5. Thus, the sensed process parameters 95 and historic data acquisition 96 from the process historian database are subsequently displayed together on the workstation 85. Therefore, the operator 90 has full access to historical and sensed process parameters 95, and is able to make adjustments as needed based thereon.

As disclosed in box 180, the measured process parameters 95 (e.g., sensed and possibly adjusted based on historical comparisons) are implemented into an algorithm on the distributed control system 80. The algorithm is based on the reactor modeling developed from theoretical packages and the process simulator chosen, as described previously. The reactor modeling is implemented on the distributed control system 80. Using the measured process parameters 95, the algorithm solves the equations via the process simulator and subsequently predicts how much hydrocarbons are absorbed in the seedbed 40 at the given interval ($ABS_{i+1}$).

As disclosed in box 185, the predicted ABS for a given interval ($ABS_{i+1}$) is compared to the critical ABS ($ABS_{critical}$), determined as disclosed previously. Depending on the amount of hydrocarbons absorbed in the seedbed 40, either lower or higher than the critical value of ABS (e.g., 0.1 g per gram of LLDPE in an embodiment involving a LLDPE seedbed 40), several options may then be considered to increase or decrease the ABS. The operator 90 may choose which process parameters 95, individually or in combination are to be adjusted up or down. As an example, the operator 90 may choose to keep the ramp rate of the feed gas composition constant [hence the mass ratio of hexene 15 to ethylene 10] and increase or decrease the temperature ramp rate. The operator 90 may also choose to keep the temperature ramp rate constant and adjust the feed gas composition by increasing or decreasing the ramp rate of comonomer, e.g., hexene, in the feed. Alternatively, the ramp rate for the temperature and feed composition may both be adjusted, for example both increased, both decreased, or one increased and the other decreased.

The temperature ramp rate may be adjusted for example by adjusting the temperature of reactants fed to the reactor, by adjusting the temperature, liquid content or both of the recycle stream 30, or combinations thereof. The ramp rate of comonomer, for example hexene, may be adjusted by increasing or decreasing the rate at which control valve system 75 is opened. Typically, the ramp rate for a given process parameter will maintain a positive value upon adjustment (i.e., slow down the rate at which the parameter is increased), but a neutral or negative ramp rate may also be used as needed to control the ABS (i.e., a neutral ramp rate where a given parameter is held constant, or a negative ramp rate where a given parameter is being decreased.

As disclosed in box 190, where the $ABS_{i+1}$ is less than the $ABS_{critical}$, the ramp rate of the temperature, flow rate of comonomer, e.g., hexene, or both may optionally be adjusted such that the ABS is increased. For example, the temperature ramp rate, flow rate of hexene ramp rate, or both may be increased or alternatively held constant. As disclosed in box 195, where the $ABS_{i+1}$ is greater than the $ABS_{critical}$, the ramp rate of the temperature, flow rate of hexene, or both may be adjusted such that the ABS is decreased. For example, the temperature ramp rate, flow rate of hexene ramp rate, or both may be decreased.

Upon adjusting the parameters to increase the ABS in box 190 or decrease the ABS in box 195, a new set of process parameter, e.g., $T_{i+2}$, $P_{i+2}$, $FH_{i+2}$, etc., are measured at a new time interval ($t_{i+2}$) as disclosed in box 170, as indicated by return arrows 200 and 205, respectively. As disclosed in box 175, the new set of process parameters are compared to the target parameter. If the measured process parameters equal (within an acceptable tolerance) the target process parameters, then start-up is complete, as disclosed in box 177. If the measured process parameters do not equal (within an acceptable tolerance) the target process parameters, the measured process parameters are used to calculate the $ABS_{i+2}$, as disclosed in box 180 and described previously. The $ABS_{i+2}$ is compared to the $ABC_{critical}$, and the process parameters may be further adjusted to increase, decrease, or hold constant the ABS, as described previously. The sequence of boxes 170, 175, 180, 185, 190, 195, and return arrows 200 and 205, e.g., measuring the process parameters, comparing to the target, and adjusting ramp rates based upon a comparison of the critical ABS ($ABS_{critical}$) to a predicted ABS ($ABS_n$), continues for successive time intervals ($t_n$) until start-up is completed, as indicated in box 177. By starting-up as described herein, the polymerization process may be ramped up quickly to minimize start-up time (thereby minimizing the amount of off-specification product produced), while maintaining the ABS less than or equal to the critical ABS (e.g., in an ethylene polymerization process, less than or equal to 0.1 g of hydrocarbons absorbed per gram of LLDPE), thereby avoiding problems associated with agglomerations or sheeting in the reactor.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method for startup of a gas phase polymerization reactor, wherein startup comprises the time prior to reaching target reaction conditions, the method comprising:
beginning the startup at initial operating parameters, and
controlling an amount of polymerizable hydrocarbon absorbed in a polymer seedbed during startup such that the amount is less than a critical amount of hydrocarbon, whereby an undesirable degree of agglomeration or sheeting on an interior wall of the reactor is avoided during startup.

2. The method of claim 1 wherein controlling the amount of polymerizable hydrocarbon absorbed further comprises determining a critical amount of hydrocarbon that may be absorbed in the seedbed and controlling reaction conditions such that the critical amount of hydrocarbon is not exceeded.

3. The method of claim 2 wherein determining the critical amount of hydrocarbon that may be absorbed in the seedbed further comprises plotting a plurality of data points for the amount of hydrocarbon absorbed in the seedbed by severity of corresponding agglomeration or sheeting and identifying an amount of hydrocarbon absorbed in the seedbed above which an undesirable degree of agglomeration or sheeting occurs.

4. The method of claim 2 wherein controlling reaction conditions such that the critical amount of hydrocarbon is not exceeded further comprises controlling a mass ratio of a comonomer to a monomer fed to the reactor.

5. The method of claim 4 wherein the comonomer comprises hexene, the monomer comprises ethylene, and the seedbed comprises LLDPE.

6. The method of claim 5 wherein the critical amount of hydrocarbon that may be absorbed in the LLDPE seedbed is less than or equal to about 0.1 g of hydrocarbon per g of LLDPE.

7. The method of claim 5 wherein the mass ratio of hexene to ethylene is measured in the range of from about 0 to about 0.5.

8. The method of claim 2 wherein controlling reaction conditions such that the critical amount of hydrocarbon is not exceeded further comprises measuring the reaction conditions and comparing the measured reaction conditions to the target reaction conditions.

9. The method of claim 8 wherein controlling reaction conditions such that the critical amount of hydrocarbon is not exceeded further comprises predicting the amount of hydrocarbon absorbed in the seedbed based on the measured reaction conditions.

10. The method of claim 8 wherein the measured reaction conditions comprise a mass ratio of a comonomer to a monomer fed to the reactor.

11. The method of claim 8 wherein the measured reaction conditions comprise temperature and pressure of the reactor.

12. The method of claim 10 wherein the comonomer comprises hexene, the monomer comprises ethylene, and the seedbed comprises LLDPE.

13. The method of claim 9 wherein predicting the amount of hydrocarbon absorbed in the seedbed further comprises regressing flash parameters for a monomer, a comonomer, and the seedbed.

14. The method of claim 13 wherein predicting the amount of hydrocarbon absorbed in the seedbed further comprises regressing flash parameters for hexene, ethylene, and LLDPE.

15. The method of claim 9 wherein predicting the amount of hydrocarbon absorbed in the seedbed further comprises calculating the amount of hydrocarbon absorbed in the seedbed based on the flash parameters across an expected range of startup operating conditions.

16. The method of claim 15 wherein calculating the amount of hydrocarbon absorbed in the seedbed based on the flash parameters is implemented via a process simulator.

17. The method of claim 9 wherein controlling reaction conditions such that the critical amount of hydrocarbon is not exceeded further comprises comparing the predicted amount of hydrocarbon absorbed in the seedbed to the critical amount of hydrocarbon that may be absorbed in the seedbed.

18. The method of claim 17 wherein controlling reaction conditions such that the critical amount of hydrocarbon is not exceeded further comprises adjusting the reaction conditions such that the amount of hydrocarbon absorbed in the seedbed decreases where the predicted amount of hydrocarbon absorbed in the seedbed is greater than the critical amount of hydrocarbon that may be absorbed in the seedbed.

19. The method of claim 17 wherein controlling reaction conditions such that the critical amount of hydrocarbon is not exceeded further comprises adjusting the reaction conditions such that the amount of hydrocarbon absorbed in the seedbed increases where the predicted amount of hydrocarbon absorbed in the seedbed is less than the critical amount of hydrocarbon that may be absorbed in the seedbed.

20. The method of claim 12 wherein controlling reaction conditions such that the critical amount of hydrocarbon is not exceeded further comprises comparing the predicted amount of hydrocarbon absorbed in the LLDPE seedbed to the critical amount of hydrocarbon that may be absorbed in the LLDPE seedbed and adjusting the mass ratio of hexene to ethylene such that the predicted amount of hydrocarbon absorbed in the LLDPE seedbed does not exceed the critical amount of hydrocarbon that may be absorbed in the LLDPE seedbed.

* * * * *